UNITED STATES PATENT OFFICE.

LEE SHOWERS, OF CHARLEROI, PENNSYLVANIA, ASSIGNOR TO PITTSBURGH PLATE GLASS COMPANY, OF PITTSBURGH, PENNSYLVANIA, A CORPORATION OF PENNSYLVANIA.

METHOD OF FINISHING GLASS.

1,373,532.  Specification of Letters Patent.  Patented Apr. 5, 1921.

No Drawing.  Application filed February 10, 1915. Serial No. 7,441.

*To all whom it may concern:*

Be it known that I, LEE SHOWERS, a citizen of the United States, residing at Charleroi, in the county of Washington and State of Pennsylvania, have invented certain new and useful Improvements in Methods of Finishing Glass, of which the following is a specification.

The invention relates to an improved method of producing a finish upon glass. It is particularly designed for use upon the white opaque glass known as Carrara glass, but it will be understood that the invention is not limited to use with such glass. The primary object of the invention is the production of a soft satin finish lacking the luster of polished glass and at the same time of such a character that it will not readily take a pencil mark or stain and may be easily cleaned.

Heretofore the satin finish has been secured in Carrara glass by smoothing the glass in the usual way and omitting the polishing process. Glass so finished while having a finish of the desired appearance, has the disadvantage of easily taking pencil marks and staining and cannot be kept in a clean and presentable appearance.

The result has also been attempted by just "breaking" the surface of the glass in the polishing operation without completing such operation, so that the product lacks the high luster of fully polished plate glass. This has been unsuccessful for the reason that a partial polish cannot be uniformly applied, parts of the surface being more highly polished than others and the surface presenting a mottled appearance.

My invention is designed to overcome the disadvantages and difficulties incident to the processes heretofore described, and its distinction over the usual finishing operation as heretofore employed with plate and Carrara glass consists in the polishing operation, the glass being ground and smoothed preliminary to the polishing operation just as has always been done.

In the polishing operation as heretofore practised in the manufacture of plate glass, the felts employed upon the polishing blocks were kept wet until the clouded surface characteristic of "smoothed" glass disappeared and the polish appeared. The felts were then permitted to dry, rouge being applied during the further polishing action. If the blocks are not kept wet during the first polishing action a peculiar flowing or roughing occurs upon the surface of the glass, such action being known in the art as "burning" and it is impossible to remove this burned surface without the use of a mild abrasive such as pumice stone. If rouge is employed during the burning action the surface has a red look which cannot be washed out subsequently.

My invention consists in utilizing the burning action to secure the desired finish upon Carrara or other smoothed glass upon which a satin finish is desired, but without any discoloration of the glass. In carrying out the invention I use polishing felts which are substantially dry, only enough water being employed to keep the glass reasonably cool. Upon these felts I use putty powder mixed with water to substantially the consistency of paint. The action is similar to the "burning" heretofore referred to but no discoloration of the glass occurs, since any putty powder which is incorporated into the surface of the glass in the burning action has substantially the color (white) as the Carrara glass. The finish thus produced is soft and pleasing to the eye. It lacks the objectionable reflecting characteristic of the ordinary plate glass polish and at the same time is of such smoothness that it will not easily stain or take a pencil mark and may be easily cleaned.

What I claim is:

1. The method of finishing smoothed Carrara glass which consists in employing relatively dry polishing members with putty powder as a polish and burning the smoothed surface.

2. The method of finishing smoothed relatively opaque glass which consists in employing polishing members with a polishing powder approximating in color that of the glass and maintaining the members at a degree of dryness such as will cause a burning of the glass.

In testimony whereof I have hereunto signed my name in the presence of the two subscribed witnesses.

LEE SHOWERS.

Witnesses:
H. K. HITCHCOCK,
C. S. LAMB.